United States Patent
Johnson et al.

(10) Patent No.: US 7,924,723 B2
(45) Date of Patent: *Apr. 12, 2011

(54) METHOD AND APPARATUS FOR PROVIDING RETRY-AFTER-TIMER OVERLOAD CONTROL

(75) Inventors: Carolyn Roche Johnson, Holmdel, NJ (US); Eric Noel, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 98 days.

This patent is subject to a terminal disclaimer.

(21) Appl. No.: 12/335,306

(22) Filed: Dec. 15, 2008

(65) Prior Publication Data

US 2010/0149972 A1   Jun. 17, 2010

(51) Int. Cl.
   *G08C 15/00* (2006.01)
(52) U.S. Cl. ......... 370/236; 370/229; 370/230; 370/235
(58) Field of Classification Search .................. 370/229, 370/230, 232, 235, 236, 241, 252; 379/111, 379/112.01, 112.06, 112.1
   See application file for complete search history.

(56) References Cited

U.S. PATENT DOCUMENTS

| | | | |
|---|---|---|---|
| 5,812,533 A | 9/1998 | Iuoras et al. | |
| 6,442,139 B1 * | 8/2002 | Hosein | 370/236 |
| 6,445,707 B1 * | 9/2002 | Iuoras et al. | 370/395.43 |
| 2006/0245359 A1 | 11/2006 | Hosein | |
| 2009/0285099 A1 * | 11/2009 | Kahn et al. | 370/236 |

* cited by examiner

*Primary Examiner* — Chi H Pham
*Assistant Examiner* — Weibin Huang

(57) ABSTRACT

A method and apparatus for handling an overload condition in a communication network are disclosed. For example, the method calculates a retry-after-timer parameter by at least one core signaling network element for at least one edge signaling network element. The method then sends the retry-after-timer parameter by the at least one core signaling network element to the at least one edge signaling network element, when a total queueing delay of the at least one core signaling network element exceeds a predefined high threshold in a measurement interval, wherein the retry-after-timer parameter is used by the at least one edge signaling network element in an overload control that throttles signaling traffic.

18 Claims, 5 Drawing Sheets

US 7,924,723 B2

METHOD AND APPARATUS FOR PROVIDING RETRY-AFTER-TIMER OVERLOAD CONTROL

The present invention relates generally to communication networks and, more particularly, to a method and apparatus for Retry-After-Timer overload control for signaling traffic in communication networks, e.g., packet networks such as Internet Protocol (IP) networks, Internet Protocol (IP) Multimedia Subsystem (IMS) networks, and Voice over Internet Protocol (VoIP) networks.

BACKGROUND OF THE INVENTION

Capacity of telephony networks is traditionally optimized to carry load during busy hour traffic while subject to some level of congestion and/or failure of network elements within a network. However, it is not engineered to account for extremely large traffic surges caused by exception events.

SUMMARY OF THE INVENTION

In one embodiment, the present invention enables a core signaling network element within a network to dynamically advertise a retry-after-timer parameter to one or more edge signaling network elements actively sending signaling traffic to the core signaling network element. For example, the method calculates a retry-after-timer parameter by at least one core signaling network element for at least one edge signaling network element. The method then sends the retry-after-timer parameter by the at least one core signaling network element to the at least one edge signaling network element, when a total queueing delay of the at least one core signaling network element exceeds a predefined high threshold in a measurement interval, wherein the retry-after-timer parameter is used by the at least one edge signaling network element in an overload control that throttles signaling traffic.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Capacity of telephony networks is traditionally optimized to carry load during busy hour traffic while subject to some level of congestion and/or failure of network elements within a network. However, it is not engineered to account for extremely large traffic surges caused by exception events, such as the sudden increase in call volumes experienced after a major disaster, or during mass calling events. Mass calling events can be triggered by contests where advertising is used to stimulate users to participate by voting via telephony end-point devices, or following an advertisement campaign after which a large number of users are incented to call to a particular number within a short period of time. In either case, the network is not engineered to handle the surge of traffic caused by the mass calling event. To cope with such exception events, operators rely on traditional network management capabilities to handle the sudden increase in traffic load effectively. However, in new and emerging packet based network, such as SIP based servers within IP networks, there are new challenges to be addressed. For example, the SIP protocol introduces new messages and requires a larger number of messages per call than in traditional telephony networks. In addition, routing within SIP networks often involves multiple routing choices to elements that can have varying capacities. SIP servers need to be able to protect against traffic surges, and need to maximize throughput during traffic overload.

Figure 1:
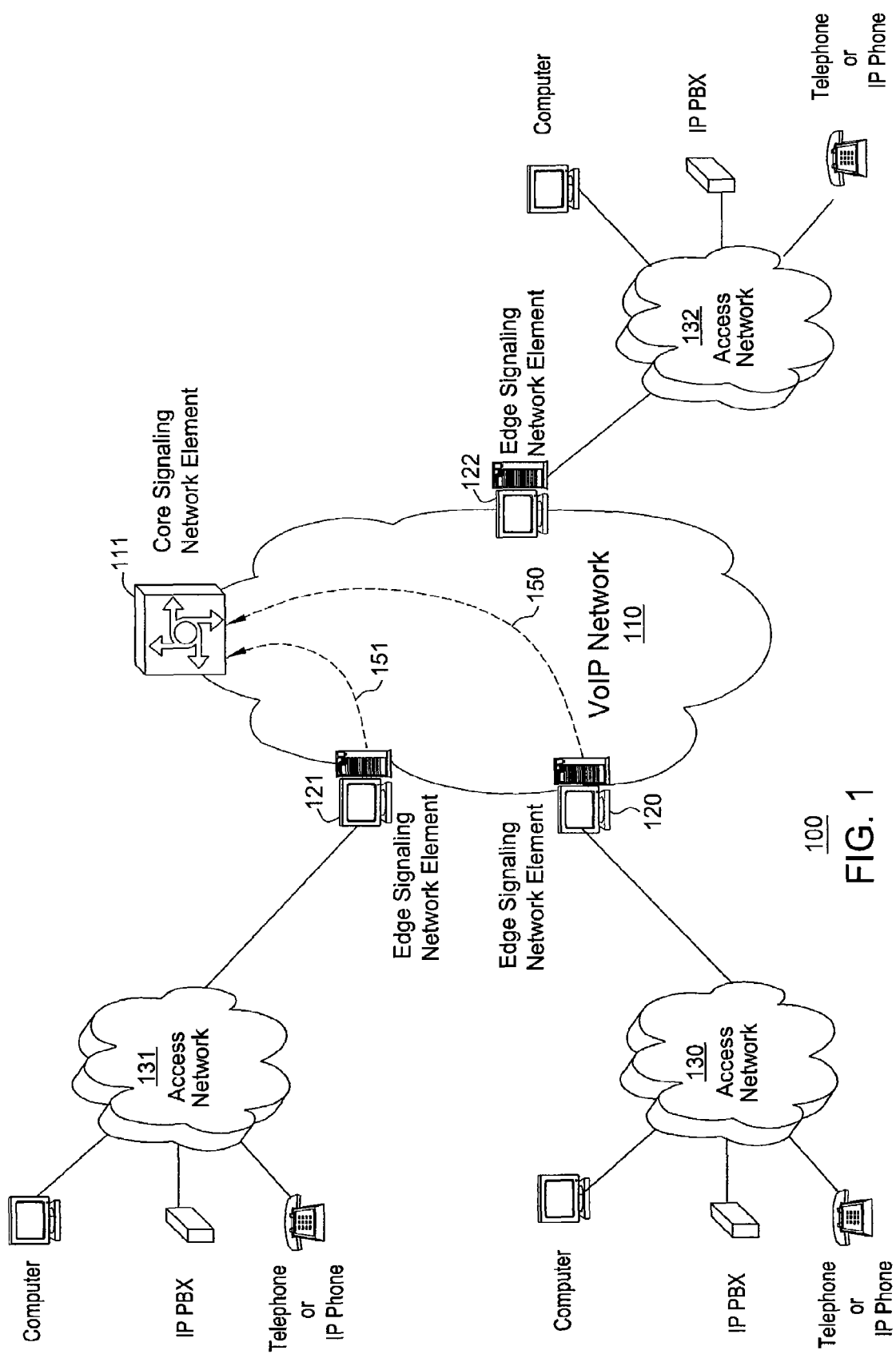
FIG. 1 illustrates an exemplary packet network, e.g., a VoIP network, related to the present invention.

To address this criticality, the present invention enables retry-after-timer overload control for signaling traffic in a packet network, e.g., an IP network, an IMS network, or a VoIP network. FIG. 1 illustrates an illustrative packet network 100, e.g., a VoIP network, related to the present invention. In FIG. 1, three edge signaling network elements 120, 121, and 122 are deployed at the edge of VoIP network 110 interconnecting access networks 130, 131, and 132, respectively. Core signaling network element 111 is interconnected with edge signaling network elements 120, 121, and 122 via the VoIP network 110. In general, a plurality of core signaling network elements and a plurality of edge signaling networks can exist in VoIP network 110.

Note that examples of an edge signaling network element include a Media Gateway or a Session Border Controller that performs signaling, media control, security, and call admission control and related functions for calls originated from an access network and to be processed by a core signaling network element. The core signaling network element resides within the packet core infrastructure and communicates with the edge signaling network elements using e.g., the Session Initiation Protocol (SIP) over the underlying IP network 110.

The core signaling network element 111 can be implemented for example as a Media Gateway Controller, a Softswitch, an Application Server, or a Call Session Control Function (CSCF) in an Internet Protocol Multimedia Subsystem (IMS) network and performs network wide call control related functions.

SIP is an example signaling protocol used between signaling network elements, and is discussed here to illustrate a signaling communications network. Broadly defined, SIP is an Internet Engineering Task Force (IETF) signaling protocol standard for creating, modifying, and terminating call sessions. These sessions include, but are not limited to, internet telephone calls, multimedia distributions, and multimedia conferences etc. SIP invitations (used to create sessions) carry session descriptions that allow entities to agree on a set of compatible media types. SIP makes use of elements called proxy servers to help route call requests, authenticate and authorize users for services, implement provider call-routing policies, and provide features to users. In FIG. 1, edge signaling network elements 120, 121, and 122 are edge proxies and core signaling network element 111 is a core proxy according to the SIP protocol standard. IMS is an architectural framework for delivering Internet Protocol (IP) multimedia to mobile users defined by the standard body, 3rd Generation Partnership Project (3GPP).

In one example, during an exception event in which a large volume of calls are placed by callers destined to access network 132, edge signaling network elements 120 and 121 process call requests originating from access networks 130 and 131 and forward the requests to core signaling network element 111 for further processing using flows 150 and 151, respectively. If the total call volume far exceeds the processing capacity of the core signaling network element 111, core signaling network element 111 can become so congested that it results in a catastrophic failure in which no calls can be processed at all. In this case, call requests destined to edge signaling network element 122 will not be processed by core signaling network element 111 for call completion to access network 132.

Figure 2:
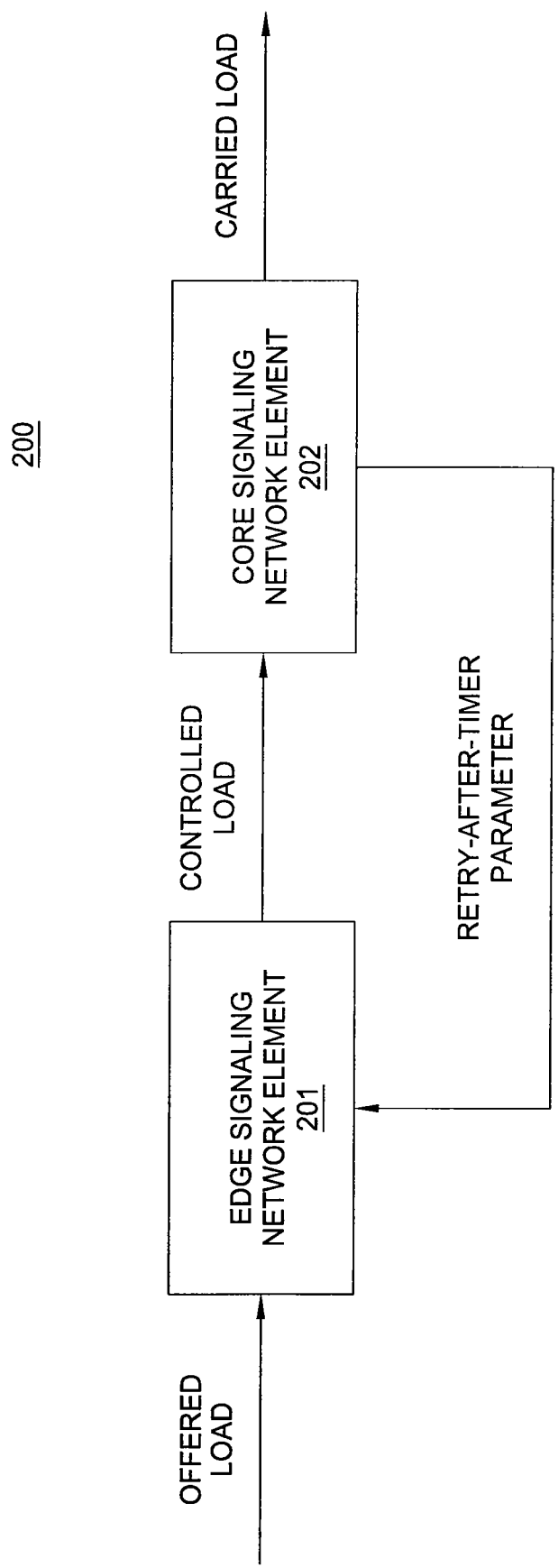
FIG. 2 illustrates an exemplary retry-after-timer overload control system related to the present invention.

FIG. 2 illustrates an exemplary retry-after-timer overload control mechanism 200 related to the present invention. In order to prevent the aforementioned catastrophic failures from happening at a core signaling network element, the present invention enables edge signaling network elements to reject traffic on behalf of the core signaling network element. In FIG. 2, offered traffic of rate $\lambda_{offered}$, arrives at edge signaling network element 201. Under overload conditions, the retry-after-timer parameter advertised by and received from core signaling network element 202 is used by edge signaling network element 201 to dynamically throttle the offered load of rate $\lambda_{offered}$, to the controlled load of rate $\lambda_{control}$, to be sent to core signaling network element 202 for processing. A timer is set by the edge signaling network element once an updated retry-after-timer parameter is received and the edge signaling network element rejects all calls that are received before the said timer expires and, thus, effectively reducing offered traffic rate to a controlled traffic rate according to the value of the received retry-after-timer parameter. The feedback mechanism allows the core signaling network element 202 to signal edge signaling network element 201 the retry-after-timer parameter which is to be used to throttle signaling traffic to be sent by edge signaling network element 201 so that core signaling network element 202 will not be overloaded.

Figure 3:
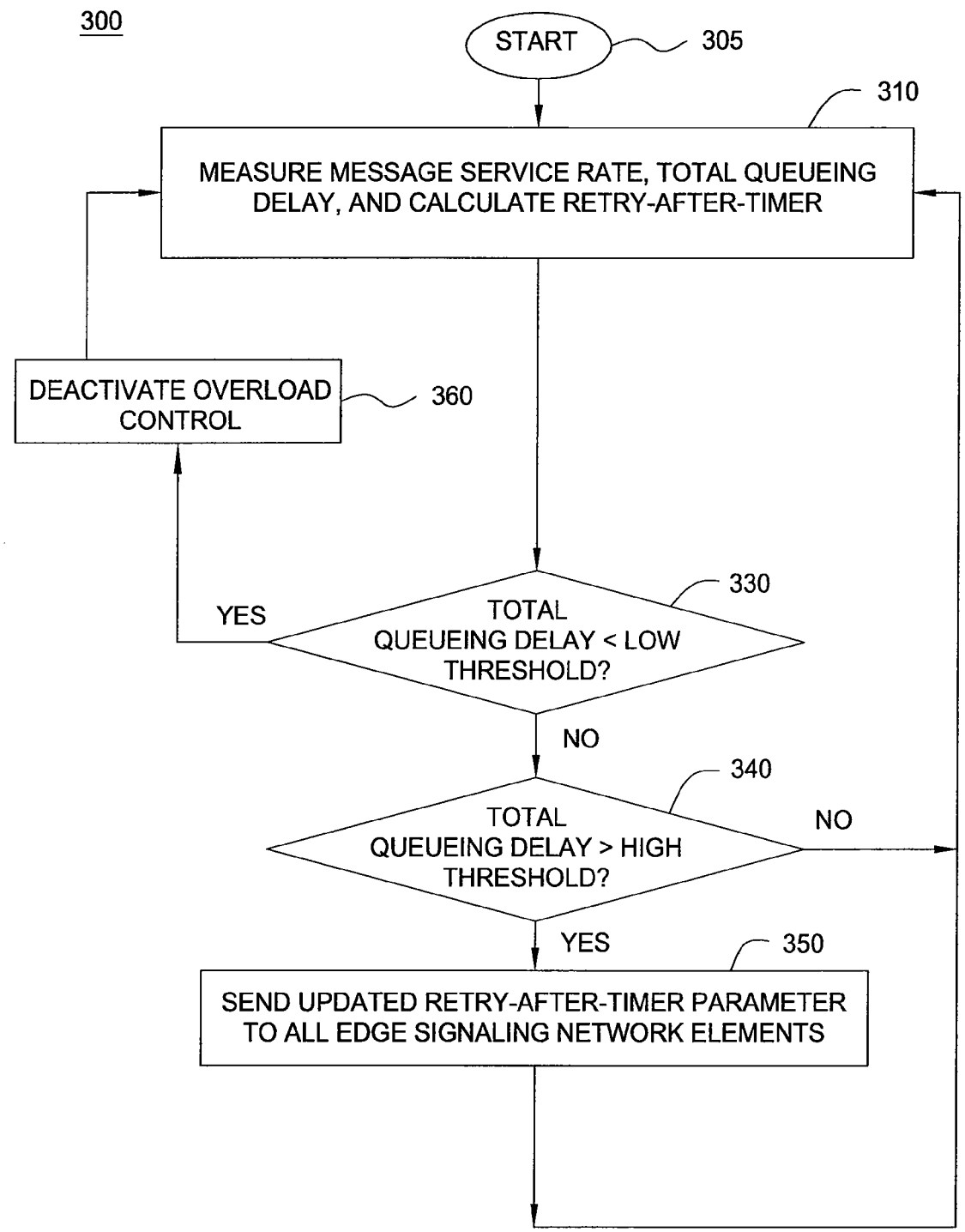
FIG. 3 illustrates a flowchart of a method for retry-after-timer overload control in a packet network, e.g., a VoIP network, of the present invention.

FIG. 3 illustrates a flowchart of a method 300 for retry-after-timer overload control in a packet network, e.g., a VoIP network, of the present invention. For example, one or more steps of method 300 can be performed by a core signaling network element. Method 300 is executed by the core signaling network element. Method 300 starts in step 305 and proceeds to step 310.

In step 310, in measurement interval t, the method measures the message service rate, $\mu_r$, (e.g., in units of messages per second) and the total queueing delay, $d_r$, as well as calculates the retry-after-timer parameter of the core signaling network element. In one embodiment, the message service rate is calculated by dividing the number of signaling messages processed in a predefined time interval T by the total busy processor time within T.

In one embodiment, the total queuing delay, $d_r$, is calculated by dividing the signaling message queue length by the measured message service rate, $\mu_r$, at the end of the predefined time interval T. Note that T is a user configurable parameter representing the duration of a sampling interval and can be set to 0.1 seconds, for example. The minimum value of $\mu_r$ is zero.

In one embodiment, the method also calculates the retry-after-timer parameter defined as $d_r - \beta * d_e$, where $d_e$ is a predefined target queueing delay parameter which is user configurable that can be set to 0.2 seconds, for example, and $\beta$ is a predefined user configurable low watermark factor that can be set to 0.1 seconds, for example. Note the retry-after-timer parameter has a minimum value of $(\alpha - \beta) * d_e$. It should be noted that the various values that are provided above and below are only illustrative and should not be interpreted as a limitation of the present invention. Namely, these values can be selected in accordance with the requirements of a particular implementation. Note that Exponentially Weighted Moving Average (EWMA) or any comparable smoothing algorithm could be used to smooth $\mu_r$.

In step 330, the method checks if the total queuing delay, $d_r$, is below a predefined low threshold. If the total queuing delay is below the predefined low threshold, the method proceeds to step 360; otherwise, the method proceeds to step 340. In one embodiment, the predefined low threshold is calculated by multiplying a predefined low watermark factor, $\beta$, with the predefined target queueing delay parameter, $d_e$, where $\beta$ and $d_e$ are user configurable parameters that can be set to 0.1 and 0.2 seconds, respectively, for example.

In step 340, the method checks if the measured total queuing delay, $d_r$, exceeds a predefined high threshold. If the total queueing delay has exceeded the predefined high threshold, the method proceeds to step 350; otherwise, the method proceeds back to step 310 to process the next measurement time interval. In one embodiment, the predefined high threshold is calculated by multiplying a predefined high watermark factor, $\alpha$, with the predefined target queueing delay parameter, $d_e$, where $\alpha$ and $d_e$ are user configurable parameters that can be set to 0.9 and 0.2 seconds, respectively, for example.

In step 350, the method sends the calculated retry-after-timer parameter to every edge signaling network elements in the core network after the duration of a predefined user configurable control interval, C, that can be set to 0.1 seconds. The method distributes the retry-after-timer parameter within the overload control message, for instance a SIP 503 signaling response messages, to all edge signaling network elements. The method then proceeds back to step 310 to process the next measurement time interval.

In step 360, the method deactivates the overload control by stopping the sending of retry-after-timer parameters to each of the edge signaling network elements, which in turn stop throttling signaling traffic sent to the core signaling network element. The method then proceeds back to step 310 to process the next measurement time interval.

Figure 4:
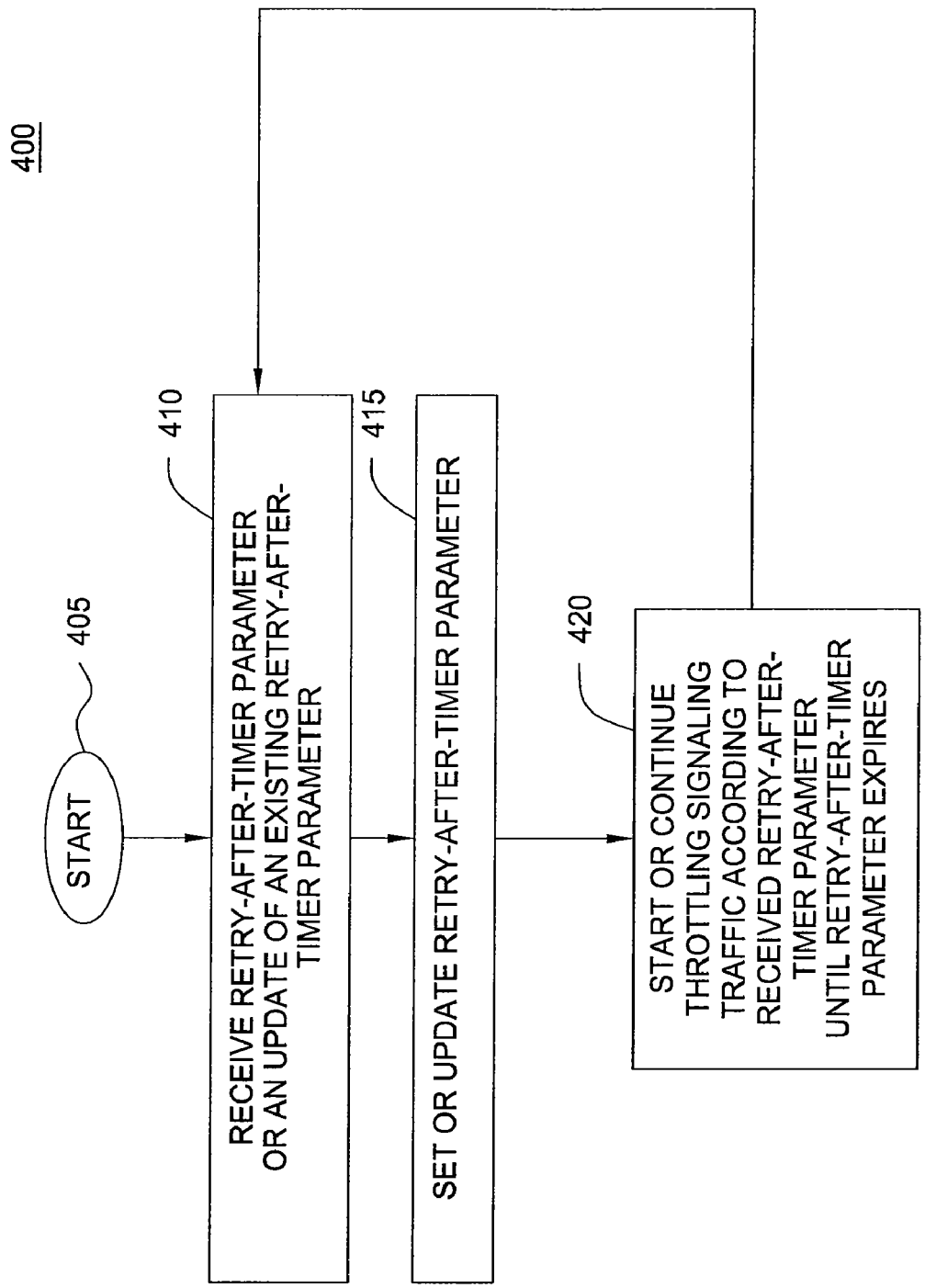
FIG. 4 illustrates a flowchart of a method for processing overload control messages in a packet network, e.g., a VoIP network, of the present invention.

FIG. 4 illustrates a flowchart of a method 400 for processing overload control messages in a packet network, e.g., a VoIP network, of the present invention. For example, one or more steps of method 400 can be executed by an active edge signaling network element.

Method 400 starts in step 405 and proceeds to step 410. In step 410, the method receives a retry-after-timer parameter from a core signaling network element. Alternatively, the method may receive an update to an existing or previously received retry-after-timer parameter from the core signaling network element.

In step 415, the method will set or update a retry-after-timer parameter, e.g., stored in a register. For example, the method may set or update a timer or a counter to the value of the received retry-after-timer parameter.

In step 420, the method either starts throttling signaling traffic toward the core signaling network element, or updates throttling of signaling traffic based on the received retry-after-timer. For all new calls (offered load) received during the retry-after-timer timeout period, i.e., before the set timer expires, the method simply rejects the calls destined toward the core signaling network element from which the retry-after-timer is received. Throttling stops once the most recent retry-after-timer expires.

It should be noted that although not specifically specified, one or more steps of methods 300 and 400 may include a storing, displaying and/or outputting step as required for a particular application. In other words, any data, records, fields, and/or intermediate results discussed in the methods 300 and 400 can be stored, displayed and/or output to another device as required for a particular application. Furthermore, steps or blocks in FIGS. 3 and 4 that recite a determining operation, or involve a decision, do not necessarily require that both branches of the determining operation be practiced. In other words, one of the branches of the determining operation can be deemed as an optional step.

Note that the edge signaling network element throttles signaling traffic at the call level. In other words, the edge signaling network element rejects signaling messages on a combination of call and signaling message basis. Each call consists of a variable number of signaling messages that depend on the call completion scenario. For example, the edge signaling network element may reject the messages based on the type of signaling message for any given call. This allows the ability to give priority to messages related to calls that are already in progress and discarding only new call messages.

In the case of multiple core signaling network elements exist in a core network, an edge signaling network element maintains a separate retry-after-timer parameter for each of the core signaling network elements. Each edge signaling network element throttles offered traffic based on its most recently received retry-after-timer parameter from a core signaling network element.

Figure 5:
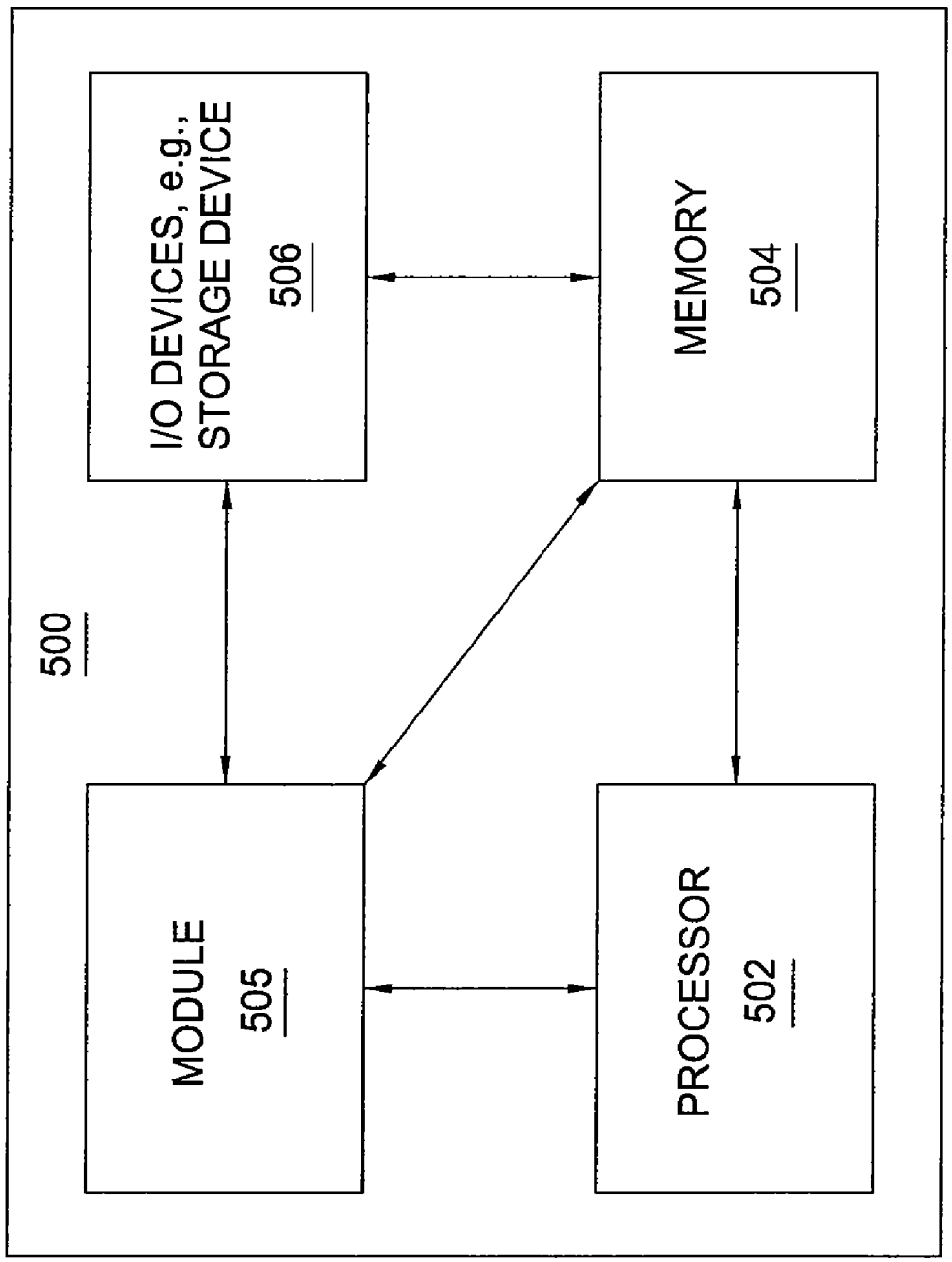
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing retry-after-timer overload control, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing retry-after-timer overload control can be loaded into memory 504 and executed by processor 502 to implement the functions as discussed above. As such, the present process 505 for providing retry-after-timer overload control (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling an overload condition in a communication network, comprising:
   calculating a retry-after-timer parameter by a core signaling network element for an edge signaling network element; and
   sending the retry-after-timer parameter by the core signaling network element to the edge signaling network element, when a total queueing delay of the core signaling network element exceeds a predefined high threshold in a measurement interval, wherein the retry-after-timer parameter is used by the edge signaling network element in an overload control that throttles signaling traffic, wherein the retry-after-timer parameter is defined as $d_t-\beta*d_e$, where $d_e$ is a target queueing delay parameter, $d_t$ is calculated by dividing a signaling message queue length by a message service rate, $\mu_t$, and $\beta$ is a low watermark factor.

2. The method of claim 1, further comprising:
   deactivating the overload control by instructing the edge signaling network element to stop throttling the signaling traffic if the total queueing delay of the core signaling element drops below a predefined low threshold in a measurement interval.

3. The method of claim 1, wherein the communication network comprises a packet network.

4. The method of claim 1, where the message service rate, $\mu_t$, is calculated by dividing a number of signaling messages processed in the measurement interval by a total busy processor time within the measurement interval.

5. The method of claim 1, wherein the throttling by the edge signaling network element is performed at a call level.

6. The method of claim 1, wherein the edge signaling network element maintains a separate retry-after-timer parameter for each of a plurality of core signaling network elements in the communication network.

7. The method of claim 1, wherein the retry-after-timer parameter is communicated within a signaling response message.

8. The method of claim 1, wherein the edge signaling network element throttles an offered load based on the retry-after-timer parameter and halts throttling if an updated retry-after-timer parameter is not received after a current timer parameter has expired.

9. The method of claim 1, wherein the edge signaling network element uses the retry-after-timer parameter to set a timer and then stops forwarding call signaling messages destined to the core signaling network element for processing until the timer expires.

10. The method of claim 1, wherein the throttling by the edge signaling network element is performed at a call level.

11. A method for handling an overload condition in a communication network, comprising:
    calculating a retry-after-timer parameter by a core signaling network element for an edge signaling network element;
    sending the retry-after-timer parameter by the core signaling network element to the edge signaling network element, when a total queueing delay of the core signaling network element exceeds a predefined high threshold in a measurement interval, wherein the retry-after-timer parameter is used by the edge signaling network element in an overload control that throttles signaling traffic; and
    deactivating the overload control by instructing the edge signaling network element to stop throttling the signaling traffic if the total queueing delay of the core signaling element drops below a predefined low threshold in a measurement interval, wherein the predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

12. A non-transitory computer-readable medium having stored thereon a plurality of instructions, the plurality of instructions including instructions which, when executed by a processor, cause the processor to perform a method for handling an overload condition in a communication network, comprising:

calculating a retry-after-timer parameter by a core signaling network element for an edge signaling network element; and sending the retry-after-timer parameter by the core signaling network element to the edge signaling network element, when a total queueing delay of the core signaling network element exceeds a predefined high threshold in a measurement interval, wherein the retry-after-timer parameter is used by the edge signaling network element in an overload control that throttles signaling traffic, wherein the retry-after-timer parameter is defined as $d_t-\beta*d_e$, where $d_e$ is a target queueing delay parameter, $d_t$ is calculated by dividing a signaling message queue length by a message service rate, $\mu_r$, and $\beta$ is a low watermark factor.

13. The non-transitory computer-readable medium of claim 12, further comprising:

deactivating the overload control by instructing the edge signaling network element to stop throttling the signaling traffic if the total queueing delay of the core signaling element drops below a predefined low threshold in a measurement interval.

14. The non-transitory computer-readable medium of claim 12, where the message service rate, $\mu_r$, is calculated by dividing a number of signaling messages processed in the measurement interval by a total busy processor time within the measurement interval.

15. The non-transitory computer-readable medium of claim 12, wherein the throttling by the edge signaling network element is performed at a call level.

16. A non-transitory computer-readable medium having stored thereon a plurality of instructions, the plurality of instructions including instructions which, when executed by a processor, cause the processor to perform a method for handling an overload condition in a communication network, comprising:

calculating a retry-after-timer parameter by a core signaling network element for an edge signaling network element;

sending the retry-after-timer parameter by the core signaling network element to the edge signaling network element, when a total queueing delay of the core signaling network element exceeds a predefined high threshold in a measurement interval, wherein the retry-after-timer parameter is used by the edge signaling network element in an overload control that throttles signaling traffic; and deactivating the overload control by instructing the edge signaling network element to stop throttling the signaling traffic if the total queueing delay of the core signaling element drops below a predefined low threshold in a measurement interval, wherein the predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

17. An apparatus for handling an overload condition in a communication network, comprising:

a core signaling network element configured to:

calculate a retry-after-timer parameter for an edge signaling network element;

send the retry-after-timer parameter to the edge signaling network element, when a total queueing delay of the core signaling network element exceeds a predefined high threshold in a measurement interval, wherein the retry-after-timer parameter is used by the edge signaling network element in an overload control that throttles signaling traffic; and deactivate the overload control by instructing the edge signaling network element to stop throttling the signaling traffic if the total queueing delay of the core signaling element drops below a predefined low threshold in a measurement interval, wherein the predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

18. An apparatus for handling an overload condition in a communication network, comprising:

a core signaling network element configured to:

calculate a retry-after-timer parameter for an edge signaling network element; and send the retry-after-timer parameter to the edge signaling network element, when a total queueing delay of the core signaling network element exceeds a predefined high threshold in a measurement interval, wherein the retry-after-timer parameter is used by the edge signaling network element in an overload control that throttles signaling traffic, wherein the retry-after-timer parameter is defined as $d_t-\beta*d_e$, where $d_e$ is a target queueing delay parameter, $d_t$ is calculated by dividing a signaling message queue length by a message service rate, $\mu_r$, and $\beta$ is a low watermark factor.

* * * * *